Feb. 28, 1956  A. G. JANUS  2,736,364
BABY SEAT

Filed May 22, 1953  3 Sheets-Sheet 1

INVENTOR
ALEXANDER G. JANUS
BY Fisher & Christen
ATTORNEY

Feb. 28, 1956 A. G. JANUS 2,736,364
BABY SEAT
Filed May 22, 1953 3 Sheets-Sheet 2
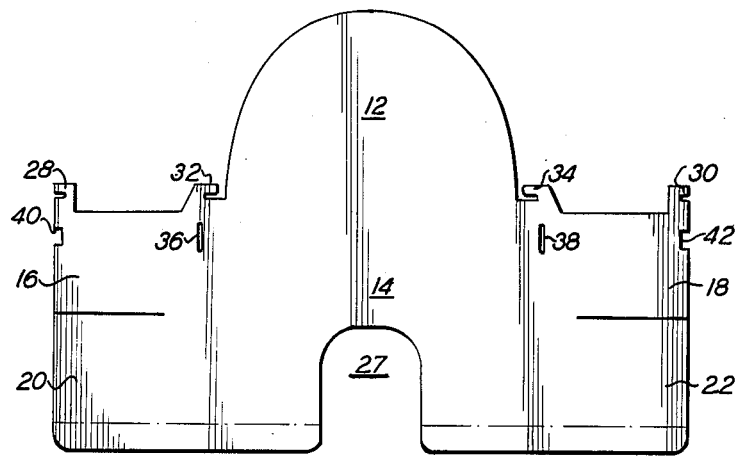
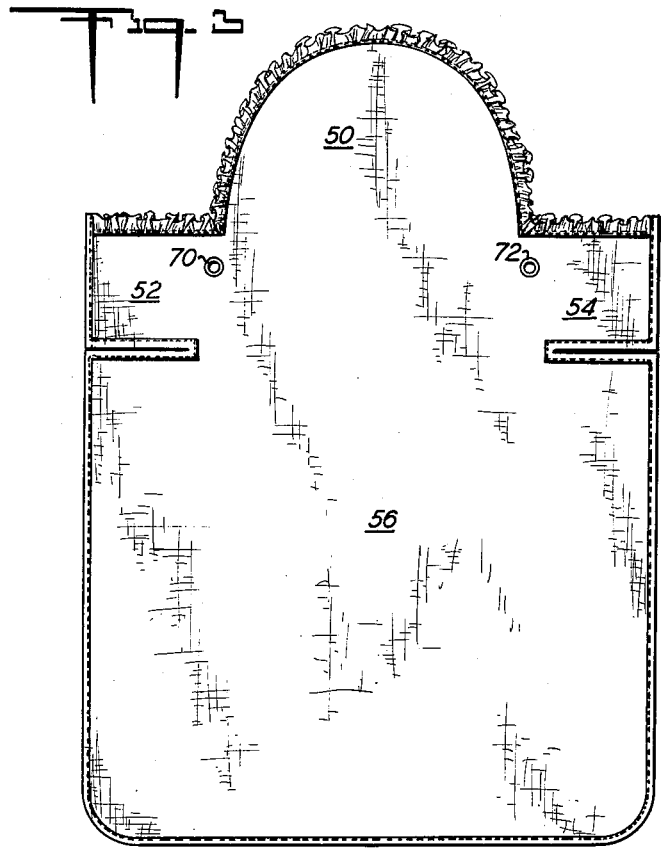
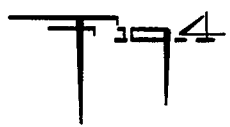
INVENTOR
ALEXANDER G. JANUS
BY Fisher & Christen
ATTORNEY Feb. 28, 1956   A. G. JANUS   2,736,364
BABY SEAT
Filed May 22, 1953   3 Sheets-Sheet 3
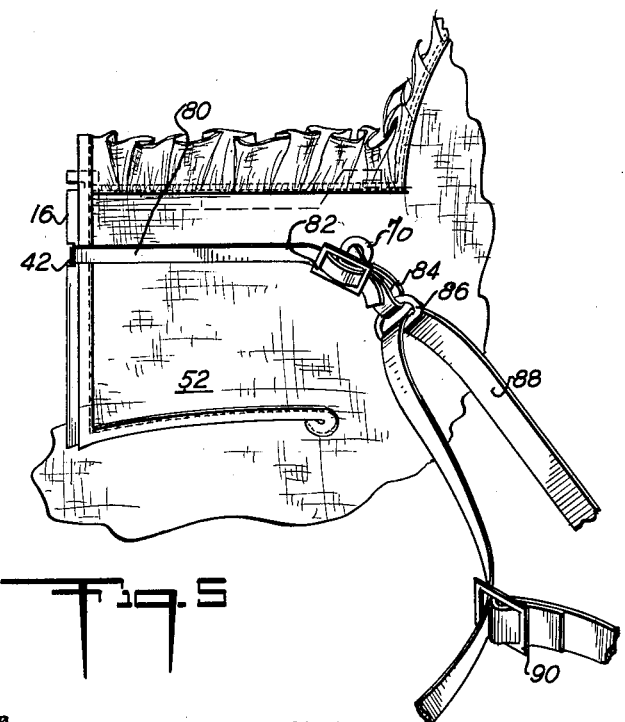
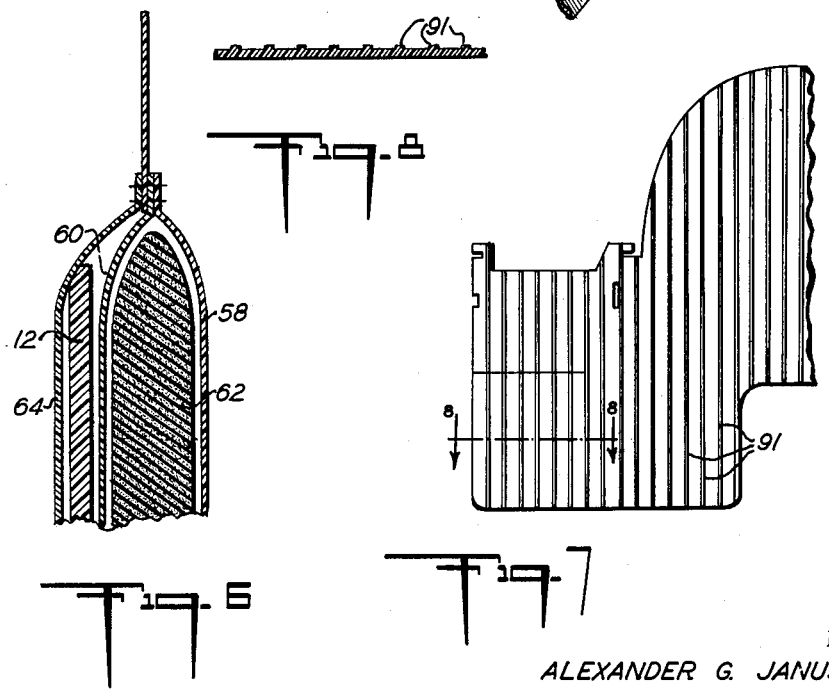
INVENTOR
ALEXANDER G. JANUS
BY *Fisher & Christen*
ATTORNEY

United States Patent Office 2,736,364
Patented Feb. 28, 1956

2,736,364

BABY SEAT

Alexander G. Janus, Falls Church, Va., assignor to George Boudouris, Jr.

Application May 22, 1953, Serial No. 356,643

6 Claims. (Cl. 155—131)

This invention relates to a collapsible baby keeper. More particularly, it relates to a portable baby seat for use with a sofa or chair or the like, provided with removable cushions.

It is an object of this invention to provide a baby keeper for anchoring an infant in the corner of a sofa.

It is another object of the present invention to provide a baby seat which can be shipped and transported as a flat article and converted into an operative unit complete with arms with no mechanical manipulations other than bending it. Other objects of this invention are provision of a baby seat characterized by its economy, comfort, simplicity, and ease of care. Other objects of the invention will be apparent from the detailed description of the invention, the accompanying drawings and the appended claims.

The objects of this invention are accomplished by a generally flat seat frame easily bent into the desired form, a cover for the frame, and means for holding a child therein.

The frame is made from a single sheet of flat, semi-rigid material and includes a back, a pair of arms and a pair of supports. The back includes an upper portion which is independent and a unitary lower portion which carries the arms and supports. An arm and support extend laterally from each side of the back when the frame is being transported. Each arm may be joined to its corresponding support, or they may be separated; although the latter construction is definitely preferred. Each support includes a flange adapted to slide under a sofa cushion to anchor the frame in place. A part of the back is cut out at the bottom between the supports to facilitate bending the back to make it conform to the corner of a sofa. When the frame is positioned on a sofa, each support will engage adjacent sides of same cushion at a 90° angle to one another, and each flange will be positioned under the cushion.

The frame is formed from a single sheet of semi-rigid material which can be bent into the desired form. It is normally flat, except for the support flanges, and tends to return to that form each time it is removed from a sofa. Suitable frames have been cut from sheets of thermoplastic materials, sheet metal, particularly aluminum and fiberboard. Suitable frames have been molded from thermoplastic materials and fiberboard. The preferred material is flexible enough to be easily bent into the desired shape from a flat form, resilient enough to return to a generally flat form when released, and rigid enough when positioned on a sofa to retain its general shape to the extent that a baby cannot tip it forward or sideways.

The cover is preferably a plastic, washable, waterproof material. It is provided with arms and a back that generally coincide with and cover the upper part of the frame. It is also provided with a seat that spreads across the top of the sofa cushion to protect it from the usual food scattering, milk spilling and wetting hazards. The cover generally has the same configuration as the frame and covers the front of its arms and upper back portion, but not either the supports or that part of the back which fits behind the sofa cushion. The back and arms of the cover are provided with foam rubber cushioning, or the like, sandwiched between plastic fabric layers to make the seat comfortable. A separate plastic sheet is fastened to the back of the cover around the edges of the upper back to form a slip cover pocket for fastening the cover on the frame back. Mating holes in the frame arms and cover arms are provided for straps which releasably connect them.

The means for holding a child include a waist-encircling child retaining belt carried by the frame. Preferably the belt is suspended from D rings attached to the frame through the same straps that secure the cover arms on the frame arms.

When the baby seat of this invention is positioned on a sofa, or chair, the curvature of the back makes it relatively rigid. The curvature or angles of the flanged supports also add to their rigidity over and above the semi-rigidity of the sheet material.

In the preferred form of the invention, a toy string is used to pull the two arms forward so that they extend almost parallel to one another. The toy string thus serves the dual function of providing amusement for the occupant and securing the frame arms in the desired position. This preferred position of the frame arms enables them to act as props to prevent the back from tipping forwardly and at the same time adds to the curvature of the back for even more rigidity and strength.

The invention will be better understood by reference to the accompanying drawings in which:

Fig. 3 is a plan view of a frame blank.

Fig. 4 is a plan view of a baby seat cover.

Fig. 5 is a detailed perspective view of one frame arm and attached cover arm.

Fig. 6 is a diagrammatic cross-section of the cover, taken along line 6—6 of Fig. 1.

Fig. 7 shows one modification of the invention in which a molded thermoplastic material is formed into a blank frame.

Fig. 8 is a line along 8—8 of Fig. 7.

Figure 1:
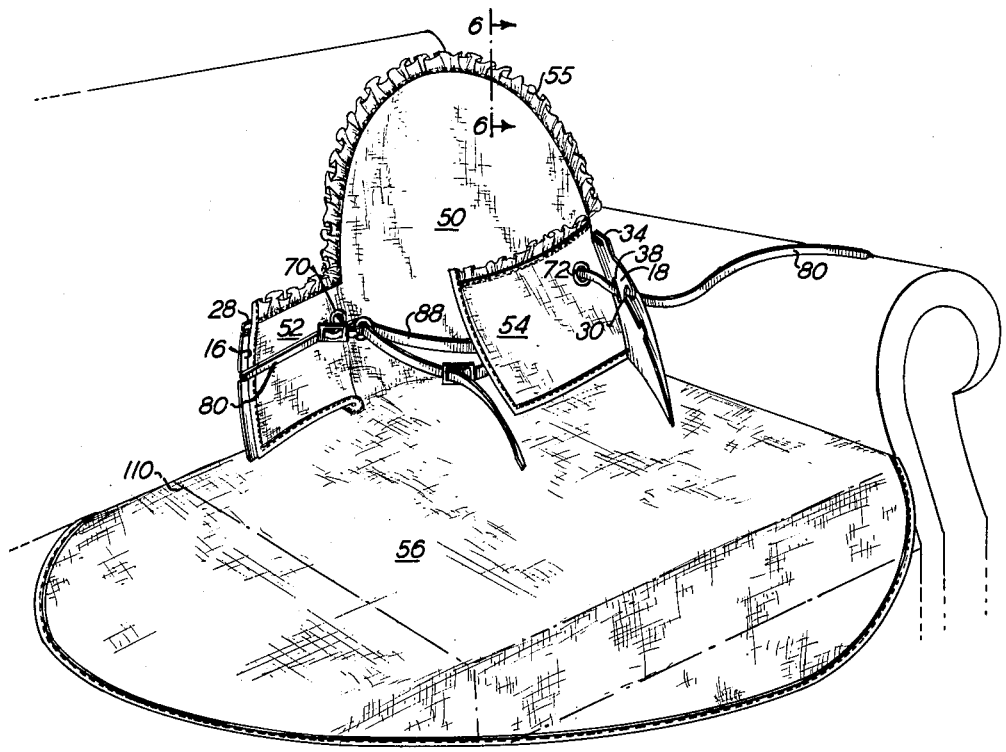
Fig. 1 is a perspective view of the presently preferred form of the invention fixed on a sofa with one cover arm partially detached from one frame arm.

Referring now to that preferred construction of the invention shown in Figures 1-6 inclusive, a frame for a baby seat is indicated generally at 10. The frame is constructed from a flat sheet of a semi-rigid styrene plastic about ⅛″ thick. It is attractively colored and has the general appearance of heavy cardboard. The frame is made up of an upper back portion 12, a lower back portion 14 which is unitary with the upper back portion, a pair of arms 16 and 18 and a pair of supports 20 and 22. The arms and the supports are made unitary with the lower portion of the back but are separated from one another by a horizontal slit. Each support 20 and 22 is provided with a bottom flange 24 and 26, respectively, permanently bent at right angles to the rest of the frame so that it may be anchored under a sofa cushion.

A cutout 27 is provided in the bottom of lower back portion 14 between the supports 20 and 22 so that the back may be easily bent along a vertical axis generally through its center. The cutout can be U-shaped as shown or can be a narrow slot. The relatively wide, U-shaped cutout is preferred because it eliminates binding at the corner of the sofa and prevents overlap of the flanges 24 and 26 in the operative position shown in Figure 2.

The top side of each arm 16 and 18 is provided with a notched front tab 28 and 30, respectively, and a notched rear tab 32 and 34, respectively, for holding a tensioned string which joins the two arms when the frame is in a position of use. A pair of vertical slots 36 and 38 are provided, with one in the upper rear portion of each of the arms 16 and 18, respectively, and a pair of notches 40 and 42 are provided with one at the forward edge of the upper portion of the arms 16 and 18. These notches and slots cooperate for carrying straps which fasten the cover onto the frame. A seat cover for the frame includes a back 50, arms 52 and 54 and a seat 56. The cover is formed from thin plastic sheet material.

As shown in Figure 4, the top plastic layer is a unitary sheet, indicated by numeral 58 in Figure 6. A second sheet of plastic 60 cooperates with sheet 58 to form a closed pocket which extends down to the seat portion and encloses a foam rubber cushion 62. A third plastic sheet 64 is fastened to back 50 of the cover along its upper arc with the seam terminating where the arms 52 and 54 join the back. Thus sheet 64 forms an open pocket on the back of the cover which receives upper back 12 of the frame for attaching the cover. The edges of the cover are bound to prevent ripping and the top of the cover is provided with a decorative ruffle 55.

A pair of holes 70 and 72 are provided in the upper back portions of cover arms 52 and 54, respectively, for mating with slots 36 and 38 of the frame. In Figures 1 and 5 it will be seen that each arm carries a strap 80 which passes through the mated holes and slots in the cover and frame arms will fit in notches 40 and 42 (Figure 5) for securing the frame and cover arms together. A buckle 82 makes the straps detachable for easy removal of the cover from the frame. Each strap 80 carries a loop 84 and a D-ring 86. A waist-encircling, child-retaining belt 88 is provided with a conventional buckle 90 and is suspended between the arms by the D-rings 86.

The frame shown in Figures 1–6 is a polystyrene sheet about 1/8" thick. In Figure 7 the same general construction is shown in a rubber molded sheet provided with ridges 90 best seen in Figure 8.

When the seat is positioned on a sofa or chair for use, a string 100 extends through the notches 28, 30, 32 and 34 and is held in position by knots 102 at each end. By adjusting the length of the string or the position of the knots, the arms can be brought as close together as is desired for the comfort of the occupant. In the form shown, toys 104 are placed on the string for the entertainment of the occupant.

Figure 2:
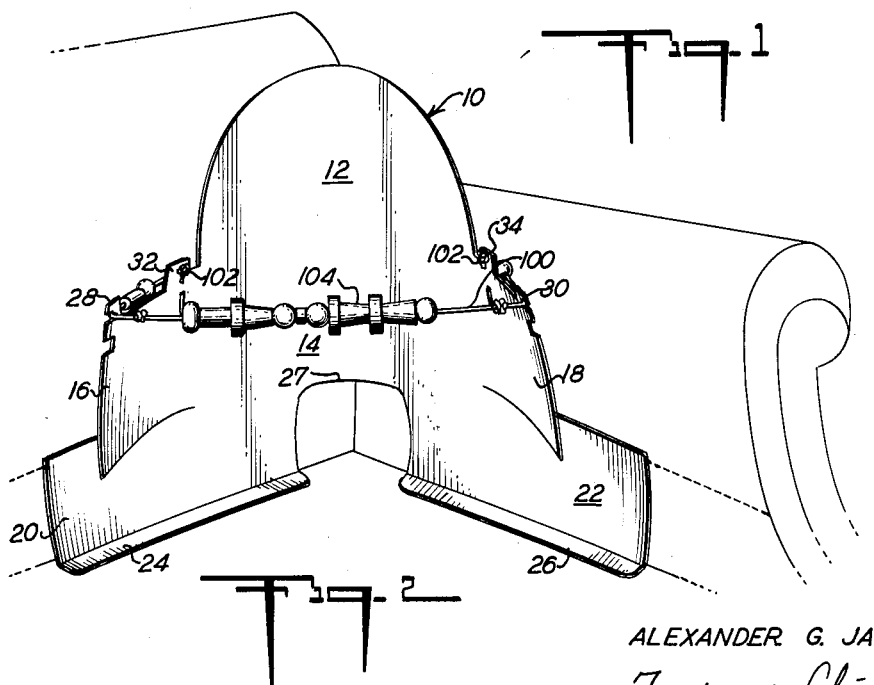
Fig. 2 is a perspective view of the frame and tensioned toy string with the baby seat cover and sofa cushion removed.

It will be seen that the cover is easily removable for cleaning or replacement. It is preferably a water-repellent, plastic material which also makes it easy to clean and makes it particularly useful for protecting the sofa from the careless habits of infants. Although the belt, the string, the straps, the cover and frame can be made and sold independently, they will be associated as a unit in use. Normally the back of the cover is slipped over the back of the frame and the straps 80 fasten the frame and cover arms together so that they do not come apart. The string 100 and the retaining belt 88 are unfastened until a child is placed in the seat. With these unfastened, the entire unit is flat, and it can be carried in a suitcase, a plastic bag or any other convenient device and only the flanges 24 and 26 protrude. They are not particularly objectionable as they only extend about 1½" or 2" away from the supports 20 and 22. When it is desired to place a child in the seat, a sofa cushion shown at 110 is removed and the frame is placed on the sofa with one support parallel to the arm of the sofa and one support parallel to the back of the sofa as shown in Figure 2. The seat of the cover is held up out of the way until the cushion is replaced. As shown in Figure 1, the sofa cushion rests in its normal position with its back against support 20, one side against support 22 and its bottom on flanges 24 and 26 so that the entire baby seat is anchored to the sofa. With the cushion replaced, the single sheet plastic seat is spread over the cushion. A child can then be placed in the seat and fastened there by means of retaining belt 88.

Finally, string 100 is positioned in the notches as shown in Figure 2 to adjust the position of the arms 16 and 18.

Thus it will be seen that by the above-defined structure it is possible to securely fasten a child in the corner of a sofa where he can be left unattended without fear of injury to the child or damage to the sofa. It will also be seen that when not in use the seat will assume a flat position which makes it easy to transport and easy to store.

The shape of the frame back is immaterial. The generally U-shaped back shown herein is preferred because of its simplicity and ease of manufacture. In one modification of the invention, not shown, the notched tabs 28, 30, 32 and 34 are eliminated by the provision of a tension member extending between the forward portions of the straps 80. In that construction, the tops of arms 16 and 18 are made with gently rounding curves to give maximum resistance to tearing. The mating slots and holes for joining the cover and frame arms can be replaced by other securing means which will be obvious to one skilled in the art. However, the structure of the present invention is particularly preferred, because it gives a positive hold at the point where the infant is to be supported.

The cushioning and the nature of the cover material and other minor modifications can be made without departing from the scope of the invention.

I claim:

1. A baby seat adapted to be anchored in the corner of a cushioned chair or sofa comprising a generally flat sheet of semirigid material having a back, a pair of arms extending forwardly from the back and a pair of flanged anchoring supports extending outwardly from the lower part of the lower back portion at about a 90° angle from one another, said flanged supports being relatively wide whereby the seat may be secured on a sofa without additional holding means.

2. A blank for a baby seat frame adapted to be anchored in the corner of a cushioned chair or sofa comprising a generally flat sheet having a back which includes an unobstructed upper portion and a lower portion unitary therewith, a pair of arms extending laterally from the upper part of the lower back portion and a pair of anchoring supports extending outwardly at about right angles from the lower part of the lower back portion, said lower back portion being provided with a cutout between said supports.

3. A blank for a baby seat adapted to be anchored in the corner of a cushioned chair or sofa comprising a generally flat sheet of semi-rigid material having a back which includes an unobstructed upper portion and a lower portion, a pair of arms extending laterally from the upper part of the lower back portion, and a pair of anchoring supports extending outwardly at about right angles from the lower part of the lower back portion, said lower back portion being provided with a cutout between said supports.

4. A frame for a baby seat adapted to be anchored in the corner of a cushioned chair or sofa comprising a generally flat sheet having a back which includes an unobstructed upper portion, and a lower portion unitary therewith, a pair of arms extending laterally from the upper part of the lower back portion and a pair of flanged anchoring supports extending laterally from the lower part of the lower back portion, said lower back portion being provided with a cutout between said supports to facilitate flexing said back along a vertical axis.

5. A frame for a baby seat adapted to be anchored in the corner of a cushioned chair or sofa comprising a generally flat sheet of semi-rigid material having a back which includes an unobstructed upper portion and a lower portion, a pair of arms extending laterally from the upper part of the lower back portion and a pair of flanged anchoring supports extending laterally from the lower part of the lower back portion, said lower back portion being provided with a cutout between said supports to facilitate flexing said back along a vertical axis.

6. An easily handled baby seat adapted to be anchored in the corner of a cushioned chair or sofa comprising (1) a normally flat frame of semi-rigid material having a back which includes an unobstructed upper portion and a lower portion unitary therewith, a pair of arms extending laterally from the upper part of the lower back portion in the carrying position and forwardly therefrom in the position of use, and a pair of flanged anchoring supports extending laterally from the lower part of the lower back portion in the carrying position and outwardly therefrom at about a right angle to one another in the position of use, said lower back portion being provided with a cutout between said supports to facilitate flexing said back along a vertical when changing from carrying position to use position, and (2) a tension member for holding said arms forward of said back during use.

References Cited in the file of this patent

UNITED STATES PATENTS

| | | |
|---|---|---|
| 1,756,182 | Drane | Apr. 29, 1930 |
| 2,237,057 | Meyer | Apr. 1, 1941 |
| 2,324,421 | Ouellette | July 13, 1943 |
| 2,503,938 | Davis | Apr. 11, 1950 |
| 2,577,949 | Barrett | Dec. 11, 1951 |
| 2,607,400 | Witz | Aug. 19, 1952 |

FOREIGN PATENTS

| | | |
|---|---|---|
| 612,993 | Great Britain | Nov. 19, 1948 |